(12) United States Patent
Martin

(10) Patent No.: US 8,813,662 B2
(45) Date of Patent: Aug. 26, 2014

(54) VERTICAL FLOATING ROW CLEANER

(71) Applicant: Howard D. Martin, Elkton, KY (US)

(72) Inventor: Howard D. Martin, Elkton, KY (US)

( * ) Notice: Subject to any disclaimer, the term of this patent is extended or adjusted under 35 U.S.C. 154(b) by 0 days.

(21) Appl. No.: 13/867,737

(22) Filed: Apr. 22, 2013

(65) Prior Publication Data

US 2013/0276683 A1 Oct. 24, 2013

Related U.S. Application Data

(60) Provisional application No. 61/636,473, filed on Apr. 20, 2012.

(51) Int. Cl.
*A01C 5/06* (2006.01)

(52) U.S. Cl.
USPC ............... 111/62; 111/69; 111/135; 111/140; 111/167; 172/146; 172/151; 172/540; 172/575; 172/604; 172/744; 172/763

(58) Field of Classification Search
USPC ........... 111/139, 140, 142, 52, 164, 166, 163, 111/167, 59, 62, 134, 135, 69; 172/144–146, 149, 151, 152, 518, 604, 172/574, 575, 612, 540, 543, 545, 546, 548, 172/549, 556, 189, 734, 744, 762, 763; 403/310, 312, 314
See application file for complete search history.

(56) References Cited

U.S. PATENT DOCUMENTS

| | | | |
|---|---|---|---|
| 4,009,668 A | 3/1977 | Brass et al. | |
| 4,785,890 A | 11/1988 | Martin | |
| 5,497,717 A | 3/1996 | Martin | |
| 5,588,382 A | 12/1996 | Embree et al. | |
| 5,697,455 A | 12/1997 | Deckler | |
| 6,148,747 A | 11/2000 | Deckler et al. | |
| 6,761,120 B2 | 7/2004 | Kovach et al. | |
| 2008/0023207 A1 | 1/2008 | Lung et al. | |

FOREIGN PATENT DOCUMENTS

| | | |
|---|---|---|
| JP | 1996080104 A | 3/1996 |
| JP | 2006101815 A | 4/2006 |

*Primary Examiner* — Christopher J Novosad
(74) *Attorney, Agent, or Firm* — Hamilton IP Law, PC; Jay R. Hamilton; Charles A. Damschen

(57) ABSTRACT

An illustrative embodiment of a vertical floating row cleaner may include a mounting bracket configured to engage a row unit frame, which mounting bracket may have a receiver engaged therewith. An extension member may have first and second ends, with one end configured as an adjustor interface and the opposite end configured to pivotally engage at least one row cleaner wheel. An adjustor may engage the extension member at the adjustor interface such that the adjustor prevents the extension member from moving with respect to the receiver past a certain point in at least one direction.

9 Claims, 8 Drawing Sheets

VERTICAL FLOATING ROW CLEANER

CROSS REFERENCE TO RELATED APPLICATIONS

Applicant claims priority from U.S. Provisional Pat. App. No. 61/636,473 filed on Apr. 20, 2012, which is incorporated by reference herein in its entirety.

FIELD OF THE INVENTION

The methods and apparatuses described herein are generally applicable to the field of agricultural equipment. The embodiments shown and described herein are more particularly for improved row cleaning for delivery of seed or fertilizer. Although in no way limiting, the present disclosure is particularly suited for minimum or no-till conditions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

U.S. Pat. No. 4,785,890 issued to Martin for "Ground-Driven Rotary Row Cleaner" illustrates prior art that may be relevant to the present disclosure, but that fails to teach the improvement disclosed and claimed herein. U.S. patents on several exemplary models of row cleaning wheels (U.S. Pat. No. 4,785,890) and closing wheels (U.S. Pat. No. 5,497,717) are incorporated by reference herein in their entirety. The operation of row planter units of the types disclosed in U.S. Pat. Nos. 4,009,668 and 6,148,747, both of which are incorporated by reference herein, is well known to those skilled in the art and not discussed in detail herein.

No-till and minimum-till agricultural practices have become more widespread in recent years. Accordingly, the market for no-till and minimum-till grain drills has grown. One such grain drill is disclosed in U.S. Pat. No. 4,760,806 issued to Bigbee et al. for "Conservation Opener," which is incorporated herein in its entirety. Various styles and types of row cleaning wheels exist for use with row cleaners mounted on either planter row units or grain drills. The proliferation of no-till planting has lead to other products related to row cleaners, such as that disclosed in U.S. Pat. No. 5,507,351 issued to Martin for "Cleaner for Tined Wheels," which is incorporated herein in its entirety.

One popular grain drill employing depth regulating and furrow closing assemblies with vertical relations that may be adjusted independently from one another is manufactured by Deere and Company, of Moline, Ill., and sold as the John Deere model no. 750 and its derivatives, the 752, 1850, 1860, and 1560. The 750-style opener unit has closing wheels inclined at twenty to twenty four degrees from the vertical and approximately eight degrees from the direction of travel.

The narrow spacing between the opener units and the "boxed in" configuration of the frame of the John Deere 750 drill have to date made it difficult to attach a suitable row cleaner thereto. For optimal performance, typically the row cleaner should be compact, adjustable, easily attached, aggressive enough to remove heavy residue for improved row clearing while not plugging adjacent or trailing opener units. The row cleaner design should inhibit or resist residue winding or wrapping between the deflector and the row cleaner wheel. Additionally, the row cleaner should allow for significant and/or adjustable down pressure to provide adequate clearing while floating (i.e., following the contour of the ground surface) if it meets with an obstacle. Finally, the row cleaner should allow adequate ground clearance when the frame of the grain drill is raised for transport.

BRIEF DESCRIPTION OF FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
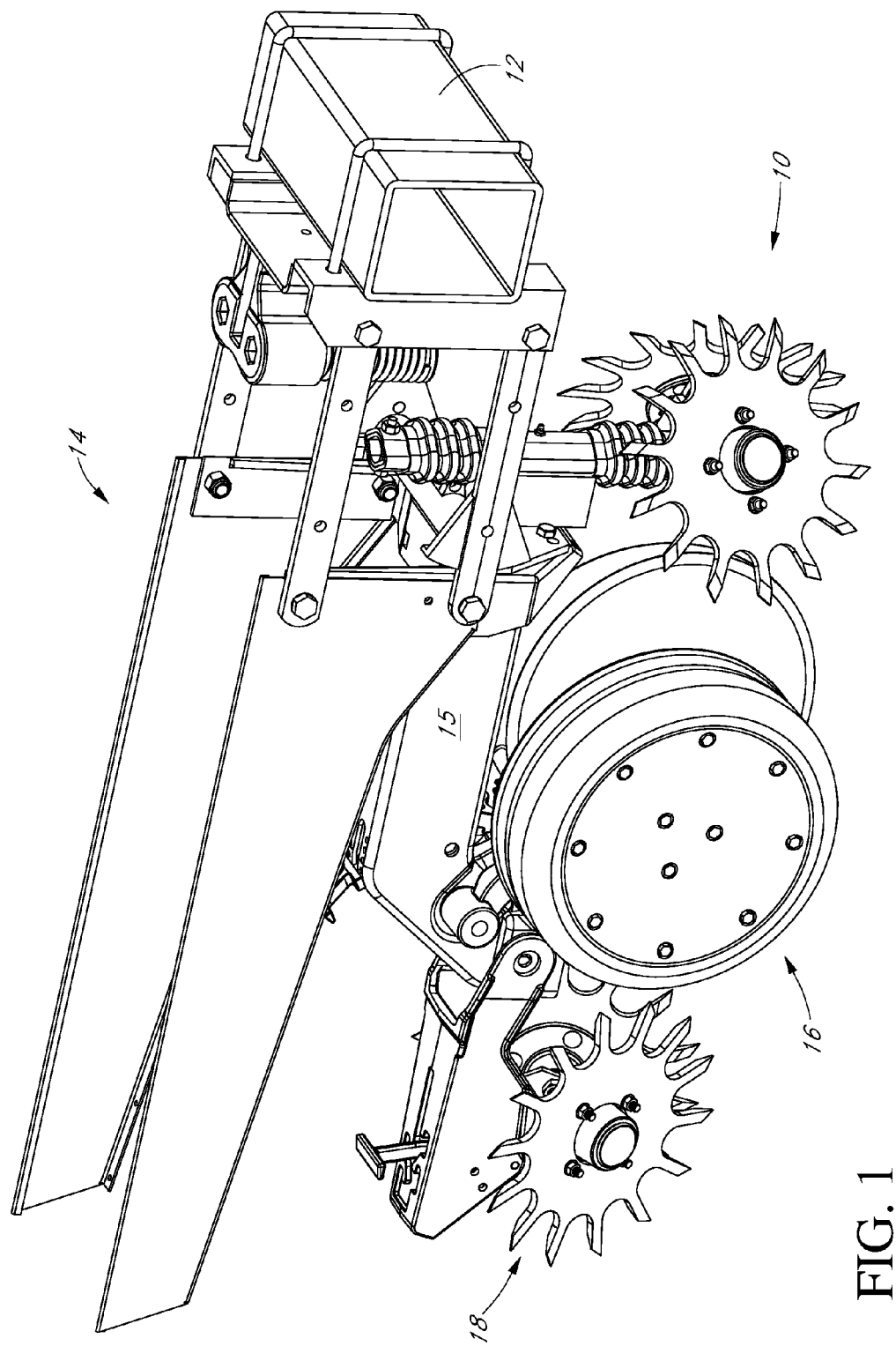
FIG. 1 provides a perspective view of the illustrative embodiment of the vertical floating row cleaner engaged with a prior art row unit.

| DETAILED DESCRIPTION - LISTING OF ELEMENTS | |
| --- | --- |
| Element Description | Element Number |
| Row cleaner | 10 |
| Toolbar | 12 |

-continued

DETAILED DESCRIPTION - LISTING OF ELEMENTS

| Element Description | Element Number |
| --- | --- |
| Row unit | 14 |
| Row unit frame | 15 |
| Opener assembly | 16 |
| Closing assembly | 18 |
| Mounting bracket | 20 |
| Aperture | 21 |
| Receiver | 22 |
| Receiver brace | 24 |
| Boot | 26 |
| Extension member | 30 |
| Adjustor interface | 31 |
| Wheel hub | 32 |
| Row cleaner wheel | 34 |
| Adjustor | 36 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

Figure 2:
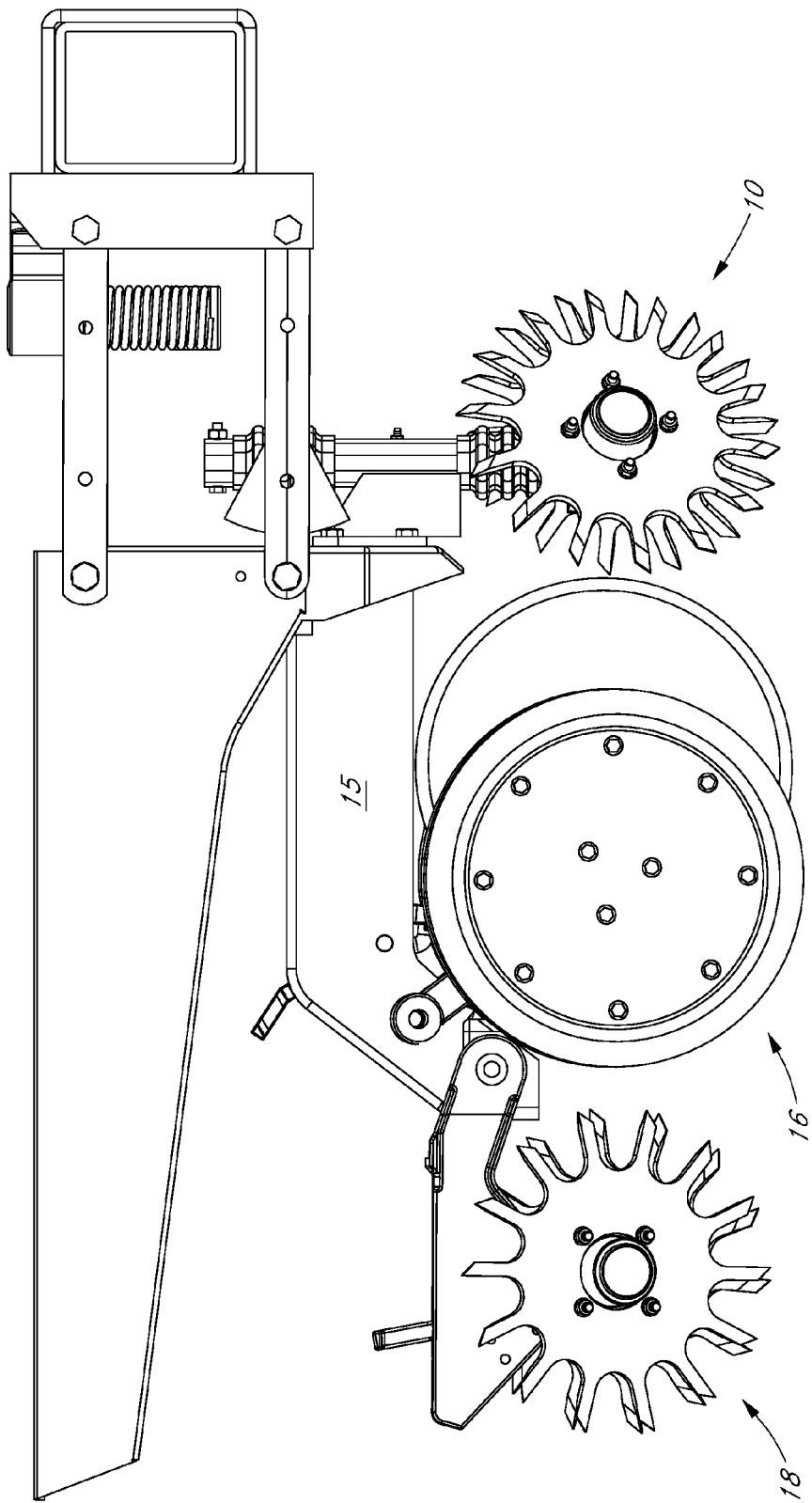
FIG. 2 provides a side view of the illustrative embodiment of the vertical floating row cleaner engaged with a prior art row unit.
Figure 3:
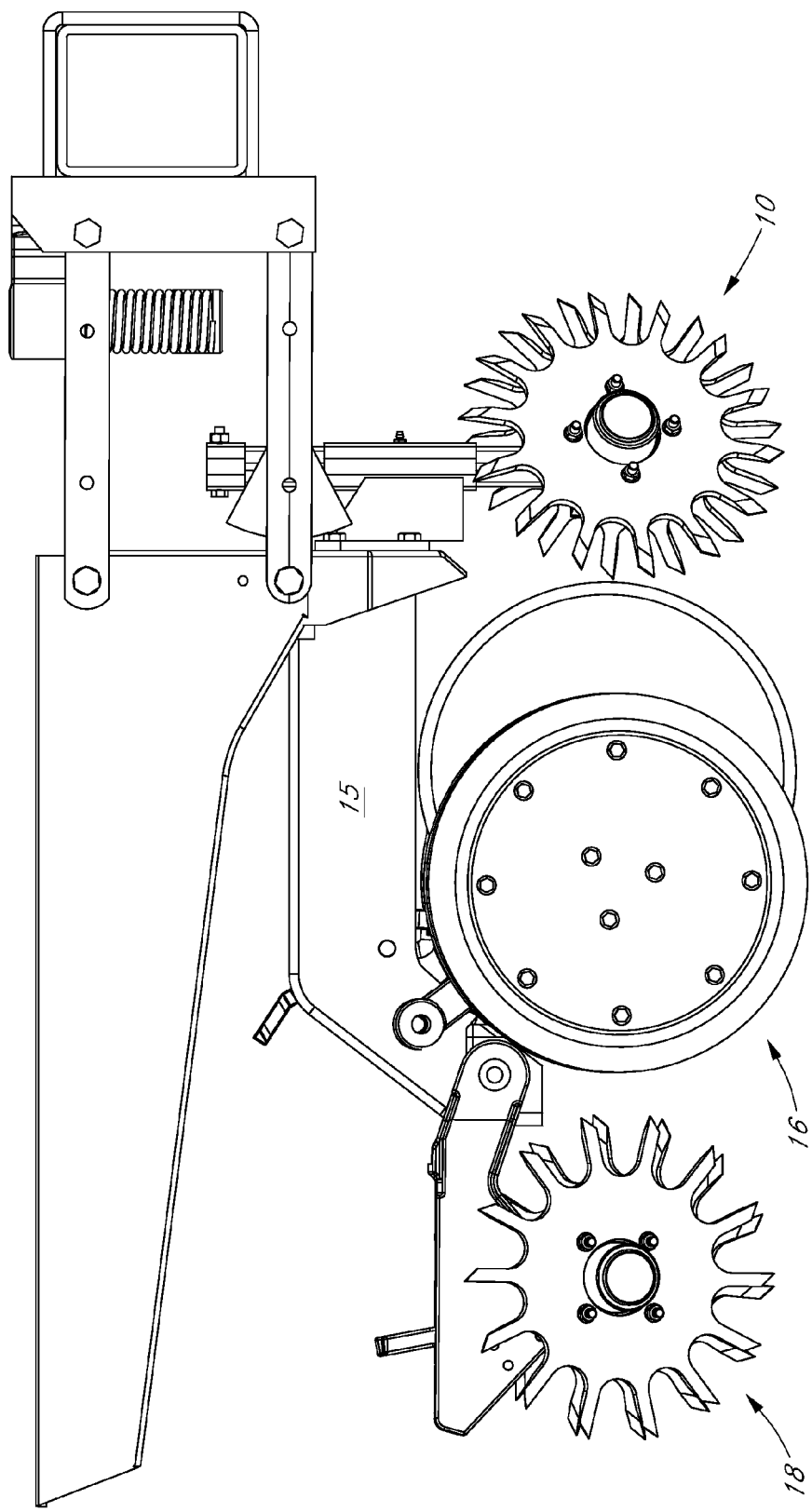
FIG. 3 provides a side view of the illustrative embodiment of the vertical floating row cleaner engaged with a prior art row unit, wherein the boots have been removed from the vertical floating row cleaner for clarity.

Referring now to the drawings, wherein like reference numerals designate identical or corresponding parts throughout the several views, FIG. 1 provides a perspective view of a prior art row unit 14 with which the illustrative embodiment of a vertical floating row cleaner 10 may be engaged, and FIG. 2 provides a side view thereof. The row unit 14 shown herein may be coupled to a toolbar 12 via parallel linkage. The row unit frame 15 may carry an opener assembly 16 for opening a furrow in the ground and/or depositing material therein and a closing assembly 18 for closing the furrow. The general use and structure of such row units 10 is well known to those skilled in the art and will not be described further herein for the purpose of clarity.

Figure 6:
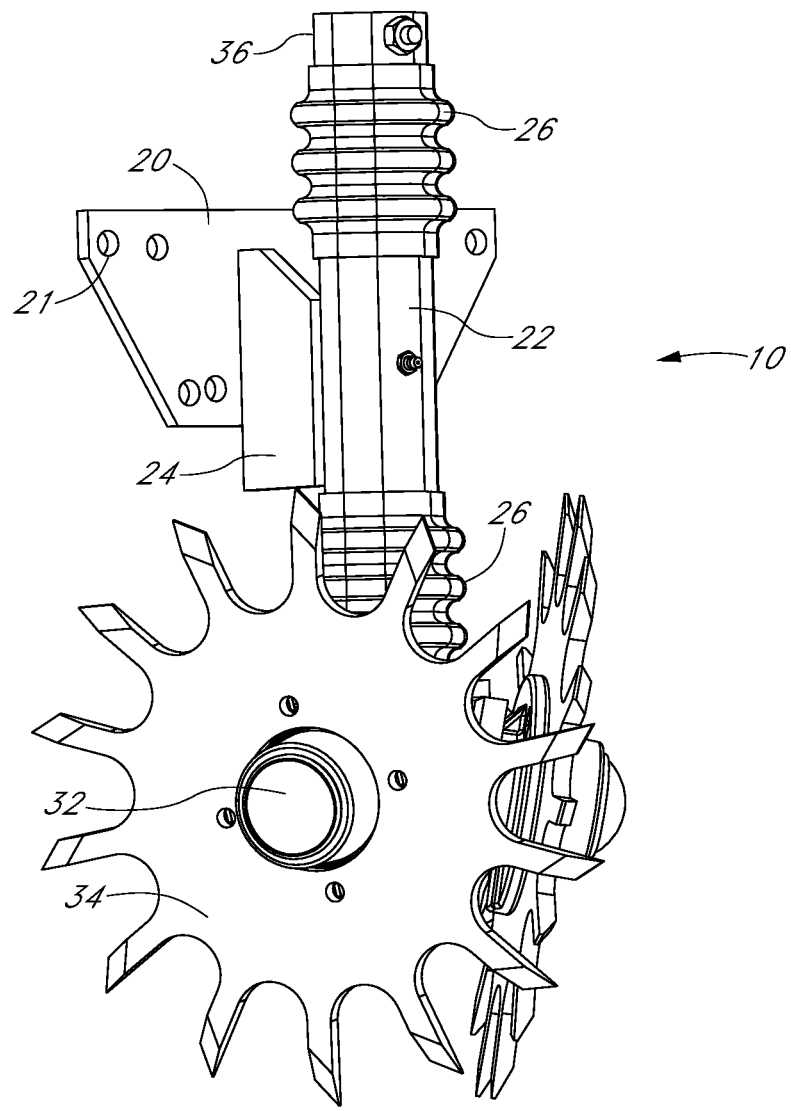
FIG. 6 provides a perspective view of the illustrative embodiment of the vertical floating row cleaner.

As shown in FIG. 6, which provides a perspective view of the illustrative embodiment of the vertical floating row cleaner 10, a mounting bracket 20 with a plurality of apertures 21 formed therein may be used to engage the row unit frame 15. The mounting bracket 20 may also include a receiver 22 oriented with a longitudinal axis generally in the vertical dimension. Receiver braces 24 may be positioned on either side of the receiver 22 to add structural rigidity and robustness to the vertical floating row cleaner 10 and/or provide additional attachment points between the mounting bracket 20 and the receiver 22.

Figure 7:
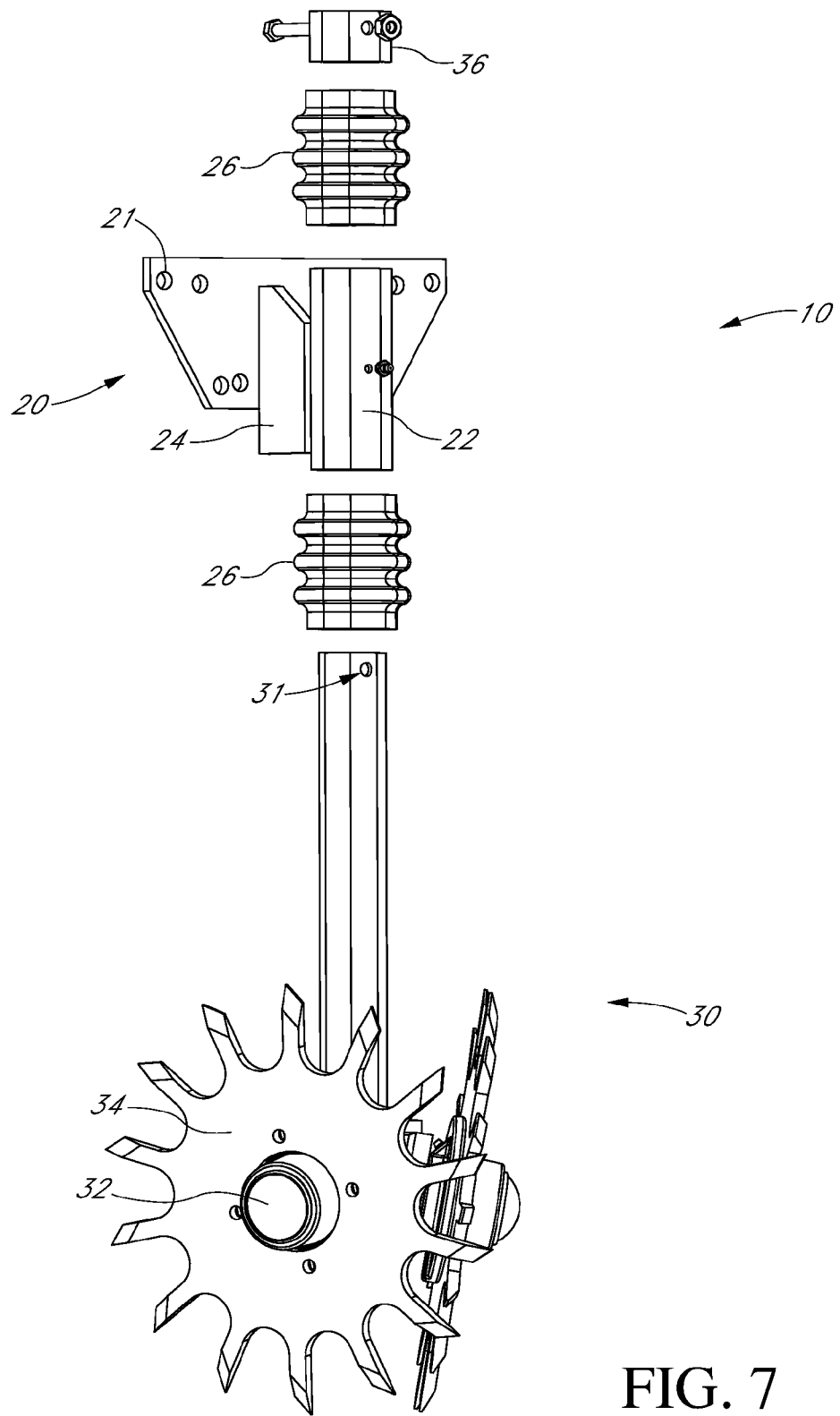
FIG. 7 provides an exploded perspective view of the illustrative embodiment of the vertical floating row cleaner.

As shown in FIG. 7, which provides an exploded view of the illustrative embodiment of the vertical floating row cleaner 10, an extension member 30 may engage the mounting bracket 20 via the receiver 22 in a concentric manner, such that the longitudinal axis of the receiver 22 and extension member 30 are generally parallel with one another and collinear. At least one wheel hub 32 (or row cleaner wheel 34) may be rotatably secured to a first end of the extension member 30, and the illustrative embodiment of the vertical floating row cleaning 10 includes two wheel hubs 32. One row cleaner wheel 34 may be engaged with each wheel hub 32, as shown in the illustrative embodiment of the vertical floating row cleaner 10. The terminal end of the extension member 30 opposite the wheel hubs 32 may be formed as an adjustor interface 31. It is contemplated that in some embodiments, the row cleaner wheel(s) 34 may be directly pivotally mounted to the extension member 30, while in other embodiments thereof the wheel hub(s) 32 may be fixedly mounted to the extension member 30 and the row cleaner wheel(s) may be pivotally mounted to the wheel hub(s) 32. Accordingly, the specific mounting structure and/or method of allowing the row cleaner wheel(s) 34 to pivot with respect to the row cleaner 10 in no way limits the scope thereof.

Figure 4A:
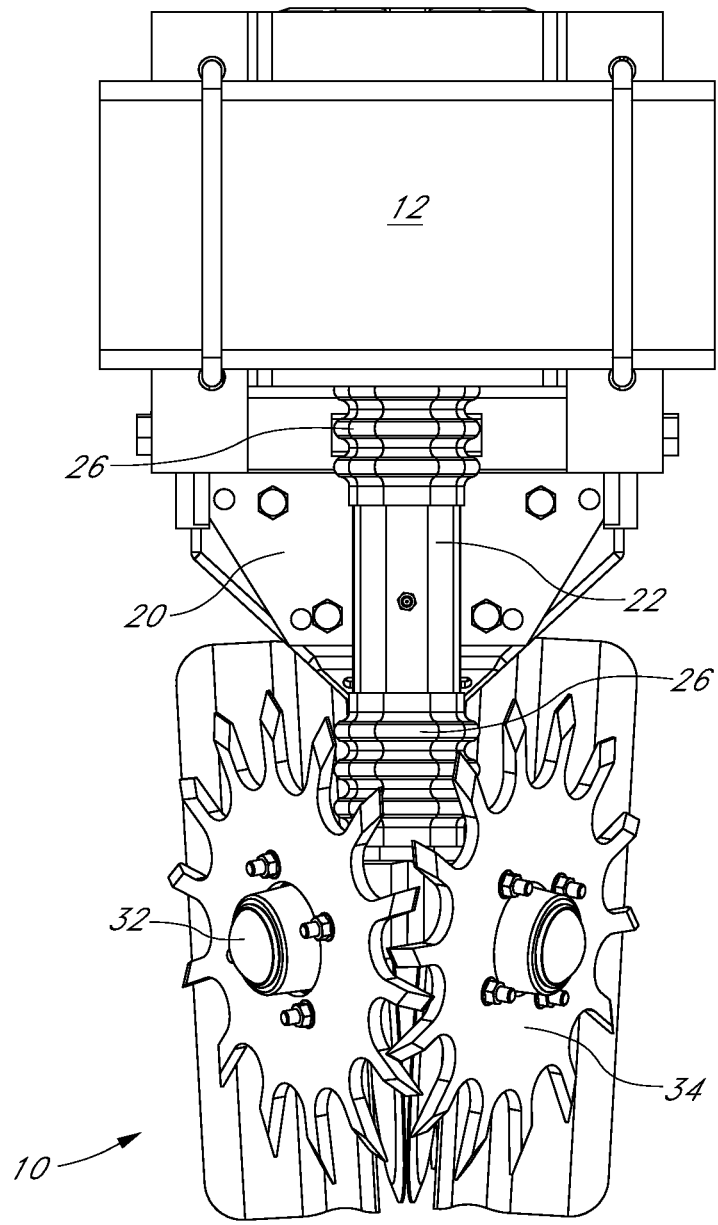
FIG. 4A provides a front view of the illustrative embodiment of the vertical floating row cleaner engaged with a prior art row unit.
Figure 4B:
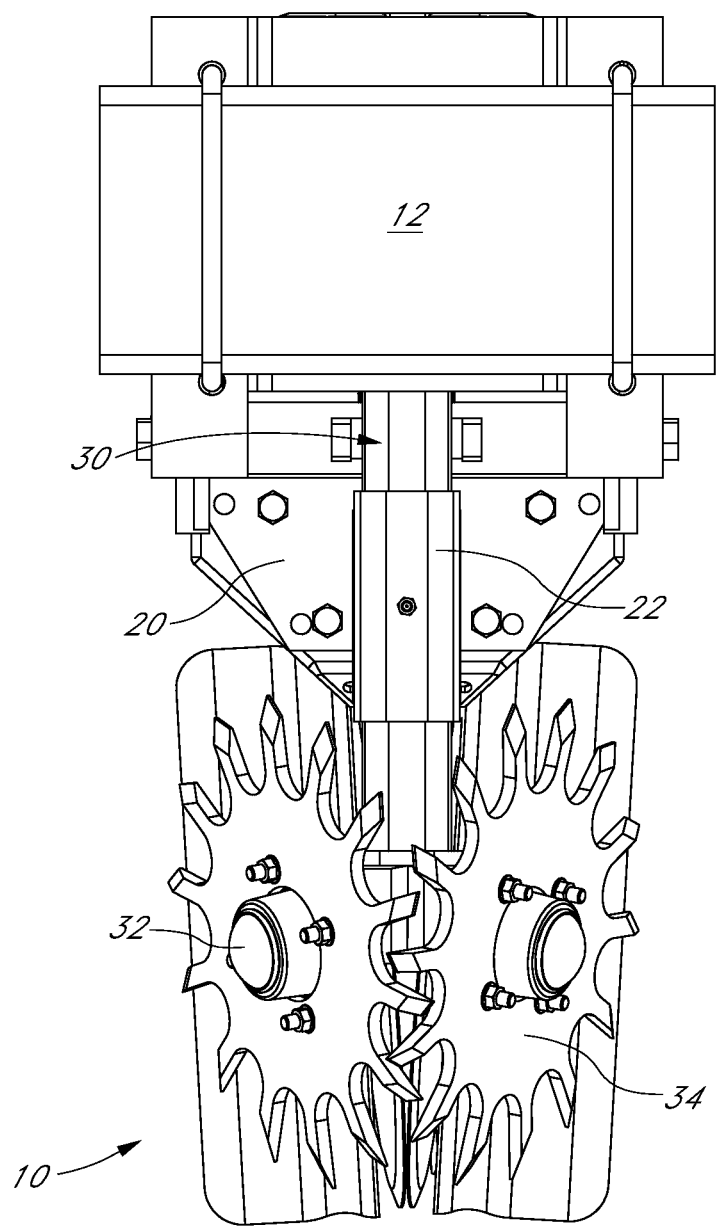
FIG. 4B provides a front view of the illustrative embodiment of the vertical floating row cleaner engaged with a prior art row unit, wherein are removed from the vertical floating row cleaner for clarity.
Figure 5:
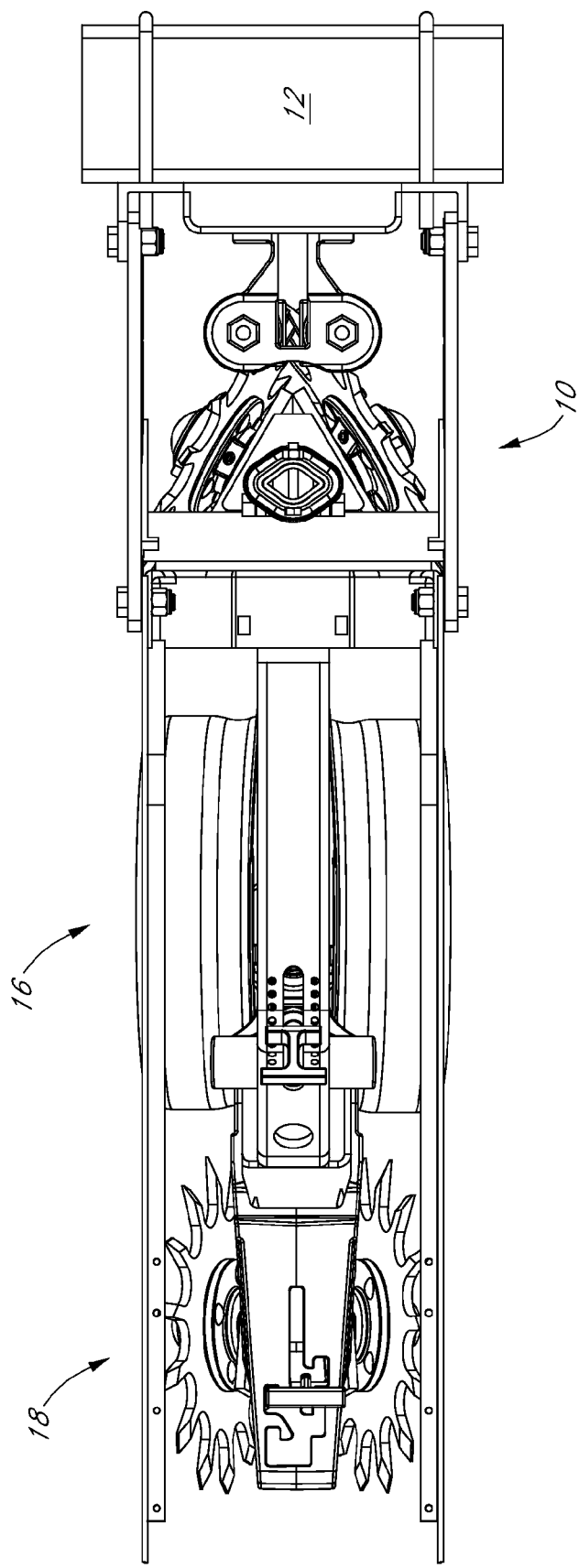
FIG. 5 provides a top view of the illustrative embodiment of the vertical floating row cleaner engaged with a prior art row unit.

The vertical floating row cleaner 10 may be secured to a front portion of the row unit frame 15 ahead of the opener assembly 16. FIGS. 4A & 4B provide front views of the illustrative embodiment of the vertical floating row cleaner 10 mounted to a row unit frame 10 with the boots 26 removed in FIG. 4B for clarity. FIG. 5 provides a top view of the same configuration wherein the direction of travel during operation of the row unit 14 is to the right of the figure.

Referring now again to FIGS. 6 & 7, the extension member 30 may be configured to slideably engage the receiver 22 secured to the mounting bracket 20. An adjustor 36 may be engaged with the adjustor interface 31 on the extension member 30 to limit the vertical travel of the extension member 30 with respect to the receiver 22 (and consequently, with respect to the mounting bracket 20 and the row unit frame 15). In the illustrative embodiment of the vertical floating row cleaner 10, the adjustor 36 is formed substantially as a diamond-shaped ring (which mimics the peripheral shape of the extension member 30 and receiver 22, as best shown in FIG. 14). The receiver 22, extension member 30, and adjustor 36 may be configured so that the extension member 30 may pass through the interior of the adjustor 36, but the adjustor 36 may not pass through the receiver 22. Other cross-sectional shapes and/or configurations may be used without limitation. The adjustor 36 may be configured so that it may be secured to the extension member 30 at different positions along the length thereof. The illustrative embodiment of the vertical floating row cleaner 10 may provide this functionality with a set screw that when tightened presses against the exterior of the extension member 30. Accordingly, an operator may allow the vertical floating row cleaner 10 to reach a maximum depth with respect to the row unit 14 by securing the adjustor 36 to the extension member 30 at the extreme distal end thereof opposite the wheel hubs 32.

A boot 26 may be placed between the adjustor 36 and the top end of the receiver 22 to prevent debris (e.g., dirt, organic material, etc.) from interfering with the movement of the extension member 30 with respect to the receiver 22 and to retain lubricant between the extension member 30 and receiver 22. A corresponding boot 26 may be placed between the wheel hubs 32 and bottom end of the receiver 22 for the same reasons.

In an embodiment of the vertical floating row cleaner 10 not shown herein, the extension member 30 may be biased in a direction toward the ground surface through a biasing member (not shown). The biasing member may be formed as a spring, actuator, or any other structure that serves to bias the extension member 30 in the vertical dimension with respect to the row unit frame 15. In another embodiment of the vertical floating row cleaner 10, the extension member 30 may be cooperatively engaged with a connector or biasing member for use with an adjustable row cleaner.

It is contemplated that the various elements of the vertical floating row cleaner 10 disclosed herein may be constructed of any suitable material known to those skilled in the art. For example, the mounting bracket 20 and extension member 30 may be constructed of, but is not limited to steel, iron, a high-resistance iron alloy, metallic alloys, and/or combinations thereof.

As is obvious to those of ordinary skill in the art, the row cleaner 10 may be configured for use and operation adjacent a plurality of row cleaners 10 attached to a plurality of corresponding row units 14 attached to a tool bar 12 to form a contiguous planter unit (not shown). To modify the amount of organic material cleared from each row, the row cleaner wheels 34 may be angled or positioned differently. For example, if the row cleaner wheels 34 are configured to intersectedly engage one another during use the row cleaner wheels 34 will remove relatively large amount of organic material. The row cleaner wheels 34 may also be configured to non-intersectedly engage one another for relatively less trash clearing.

It should be noted that the row cleaner 10 is not limited to the specific embodiments pictured and described herein, but is intended to apply to all similar apparatuses for adjusting the penetration depth of ground engaging implements, such as row cleaner wheels 34. Accordingly, modifications and alterations from the described embodiments will occur to those skilled in the art without departure from the spirit and scope of the row cleaner 10.

It should be noted that the single vertical floating row cleaner 10 is not limited to the specific embodiments pictured and described herein, but is intended to apply to all similar methods and apparatuses for ground surface penetration and/or row cleaning during operation of planter, seeder, or grain drills. Accordingly, modifications and alterations from the described embodiments will occur to those skilled in the art without departure from the spirit and scope of the vertical floating row cleaner 10. Having described several embodiments, other features of the vertical floating row cleaner 10 will undoubtedly occur to those versed in the art, as will numerous modifications and alterations in the embodiments as illustrated herein, all of which may be achieved without departing from the spirit and scope of the vertical floating row cleaner 10.

What is claimed is:

1. A vertical floating row cleaner comprising:
   a. a mounting bracket configured for engagement with a row unit frame, wherein a receiver is engaged with said mounting bracket, wherein said receiver is formed with an opening therein, wherein said opening is generally vertically oriented;
   b. an extension member configured to engage said receiver, wherein said extension member is formed with an adjustor interface at one end thereof, wherein a portion of said extension member is positioned within said receiver, and wherein said adjustor interface extends outward from said receiver above a top surface of said receiver;
   c. at least one row cleaner wheel pivotally mounted to said extension member at an end thereof opposite said adjustor interface; and,
   d. an adjustor configured to selectively engage said extension member at said adjustor interface and simultaneously engage said top surface of said receiver, wherein a weight of said extension member and said at least one row cleaner wheel urge said at least one row cleaner wheel downward, and wherein said receiver, said extension member, and said adjustor allow said at least one row cleaner wheel to move upward in a direction along a length of said extension member via relative linear movement between said extension member and said receiver.

2. The vertical floating row cleaner according to claim 1 further comprising a first boot, wherein said first boot is positioned over both a portion of said receiver and a portion of said extension member.

3. The vertical floating row cleaner according to claim 2 further comprising a second boot, wherein said second boot is positioned over both a portion of said receiver and a portion of said extension member.

4. The vertical floating row cleaner according to claim 3 wherein said receiver and a portion of said extension member are further defined as being collinear and parallel with respect to one another.

5. The vertical floating row cleaner according to claim 4 wherein said adjustor interface is further defined as a peripheral portion of said extension member extending along a first length of said extension member.

6. The vertical floating row cleaner according to claim 5 wherein said adjustor is further defined as configured with the same cross-sectional shape as that of said adjustor interface, and wherein said adjustor is positioned over said adjustor interface.

7. The vertical floating row cleaner according to claim 6 wherein said at least one row cleaner wheel is further defined as two row cleaner wheels positioned at an angle with respect to one another about said extension member.

8. The vertical floating row cleaner according to claim 7 further comprising at least one wheel hub engaged with said extension member.

9. A method of adjusting the height of a vertical floating row cleaner, wherein said vertical floating row cleaner is mountable to a row unit frame, said method comprising the steps of:
   a. engaging a mounting bracket of said vertical floating row cleaner with said row unit frame, wherein a receiver is engaged with said mounting bracket, and wherein said receiver is formed with an opening therein, wherein said opening is generally vertically oriented;
   b. positioning at least a portion of an extension member in said receiver, wherein said extension member comprises a first end configured as an adjustor interface and a second end, and wherein said adjustor interface extends outward from said receiver above a top surface of said receiver;
   c. placing an adjustor over said extension member at said adjustor interface and engaging said adjustor with said adjustor interface, wherein said adjustor and said receiver are configured so that said adjustor cannot pass by said top surface of said receiver in a generally downward direction, and wherein said extension member is moveable in a generally upward linear direction within said receiver; and,
   d. allowing at least one row cleaner wheel pivotally engaged with said extension member second end to engage a ground surface.

* * * * *